United States Patent
Boyd et al.

(10) Patent No.: US 7,590,139 B2
(45) Date of Patent: Sep. 15, 2009

(54) METHOD AND APPARATUS FOR ACCOMMODATING TDM TRAFFIC IN AN ETHERNET PASSIVE OPTICAL NETWORK

(75) Inventors: Edward W. Boyd, Petaluma, CA (US);
Ryan E. Hirth, Windsor, CA (US);
Duncan C. Gray, Sebastopol, CA (US);
Sourigno Outsama, Santa Rosa, CA (US)

(73) Assignee: Teknovus, Inc., Petaluma, CA (US)

( * ) Notice: Subject to any disclaimer, the term of this patent is extended or adjusted under 35 U.S.C. 154(b) by 537 days.

(21) Appl. No.: 11/385,431

(22) Filed: Mar. 20, 2006

(65) Prior Publication Data

US 2007/0140288 A1   Jun. 21, 2007

Related U.S. Application Data

(60) Provisional application No. 60/751,837, filed on Dec. 19, 2005.

(51) Int. Cl.
*H04B 7/212* (2006.01)
(52) U.S. Cl. .................. 370/442; 370/432; 370/254; 398/71; 398/78
(58) Field of Classification Search ............... 370/442, 370/465, 395, 389, 390, 432, 254, 236; 398/78, 398/71, 72
See application file for complete search history.

(56) References Cited

U.S. PATENT DOCUMENTS

| 6,967,949 | B2 * | 11/2005 | Davis et al. | 370/390 |
|---|---|---|---|---|
| 7,366,161 | B2 * | 4/2008 | Mitchell et al. | 370/352 |
| 7,382,739 | B2 * | 6/2008 | Kramer | 370/254 |
| 7,436,765 | B2 * | 10/2008 | Sisto et al. | 370/230 |
| 7,443,850 | B2 * | 10/2008 | Boyd et al. | 370/389 |
| 2004/0264961 | A1 * | 12/2004 | Nam et al. | 398/58 |
| 2005/0135808 | A1 * | 6/2005 | Yun et al. | 398/58 |
| 2007/0070997 | A1 * | 3/2007 | Weitz et al. | 370/389 |

* cited by examiner

*Primary Examiner*—CongVan Tran
(74) *Attorney, Agent, or Firm*—Park, Vaughan & Fleming LLP; Shun Yao

(57) ABSTRACT

One embodiment of the present invention provides a system for accommodating time-division multiplexing (TDM) traffic in an Ethernet passive optical network (EPON). During operation, the system receives data from an upstream TDM channel at a remote node and stores received data in a segmentation buffer. The system encapsulates the data stored in the segmentation buffer into a packet. The system receives a message from the central node granting a TDM transmission window starting at a designated time. The system further communicates the packet to an upstream transmission mechanism within the remote node before the designated time, and transmits to the central node an upstream frame containing the packet at the designated time.

20 Claims, 7 Drawing Sheets

METHOD AND APPARATUS FOR ACCOMMODATING TDM TRAFFIC IN AN ETHERNET PASSIVE OPTICAL NETWORK

RELATED APPLICATION

This application hereby claims priority under 35 U.S.C. § 119 to the following provisional patent application: U.S. Provisional Patent Application No. 60/751,837 filed on 19 Dec. 2005, entitled "Method and Apparatus for Accommodating TDM traffic in an Ethernet Passive Optical Network," by inventors Edward W. Boyd and Ryan E. Hirth.

BACKGROUND

1. Field of the Invention

The present invention relates to the design of Ethernet passive optical networks. More specifically, the present invention relates to a method and apparatus for accommodating TDM traffic in an Ethernet passive optical network with reduced latency.

2. Related Art

In order to keep pace with increasing Internet traffic, network operators have widely deployed optical fibers and associated optical transmission equipment, substantially increasing the capacity of backbone networks. This capacity increase in backbone networks, however, has not been matched by a corresponding increase in the capacity of access networks. Even with broadband solutions, such as digital subscriber line (DSL) and cable modem (CM), the limited bandwidth offered by current access networks still presents a severe bottleneck in delivering high bandwidth to end users.

Among the different developing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office services a number of subscribers. For example, an EPON can adopt a tree topology, wherein one fiber couples the central office to a passive optical splitter/combiner. The passive optical splitter/combiner divides and distributes downstream optical signals to subscribers and combines upstream optical signals from subscribers (see FIG. 1). In the following description, "downstream" refers to the direction from an OLT to an ONU, and "upstream" refers to the direction from an ONU to an OLT.

Transmissions within an EPON are performed between an optical line terminal (OLT) and optical network units (ONUs) (see FIG. 2). The OLT generally resides in the central office and couples the optical access network to a metro backbone, which is an external network belonging, for example, to an Internet Service Provider (ISP) or a local exchange carrier. An ONU can reside either at the curb or at an end-user location, and can provide broadband voice, data, and video services. ONUs are coupled to a one-by-N (1×N) passive optical coupler, where N is the number of ONUs, and the passive optical coupler is coupled to the OLT over a single optical link. One may use a number of cascaded optical splitters/couplers to increase the number of ONUs. This configuration can significantly save the number of fibers and amount of hardware.

Communications within an EPON include downstream traffic (from OLT to ONUs) and upstream traffic (from ONUs to OLT). In the downstream direction, because of the broadcast nature of the 1×N passive optical coupler, data frames are broadcast by the OLT to all ONUs and are selectively extracted by their destination ONUs. In the upstream direction, the ONUs need to share channel capacity and resources, because there is only one link coupling the passive optical coupler to the OLT.

Because EPONs are asynchronous packet-switched networks, currently there is no EPON implementation which can seamlessly carry time-division multiplexed (TDM) traffic while satisfying stringent quality-of-service (QoS) requirements. TDM is a technique for multiplexing a number of low-speed digital channels onto a high-speed channel by assigning fixed periodical timeslots to each low-speed channel. A TDM channel has a fixed bandwidth and typically has stringent latency requirement. For example, a T1 carrier provides a TDM channel at 1.544 Mbps. Another example is the E1 carrier which provides a TDM channel at 2.048 Mbps. To guarantee certain QoS, TDM channels usually impose jitter and latency limits. Currently, EPON technologies do not provide solutions for meeting these requirements.

Hence, what is needed is a method and an apparatus for accommodating TDM traffic in an EPON with reduced jitter and latency.

SUMMARY

One embodiment of the present invention provides a system for accommodating time-division multiplexing (TDM) traffic in an Ethernet passive optical network (EPON). During operation, the system receives data from an upstream TDM channel at a remote node and stores the received data in a segmentation buffer. The system encapsulates the data stored in the segmentation buffer into a packet. The system receives a message from a central node granting a TDM transmission window starting at a designated time. The system further communicates the packet to an upstream transmission mechanism within the remote node before the designated time, and transmits to the central node an upstream frame containing the packet at the designated time.

In a variation of this embodiment, the packet is of varying size.

In a further variation, the system includes a Real-Time Transport Protocol (RTP) header in the upstream frame, wherein the RTP header includes a timestamp that indicates the time when the data stored in the segmentation buffer is encapsulated into the packet.

In a further variation, the system receives the upstream frame at the central node. The system associates an arrival time with the received upstream frame using a clock local to the central node, and maintains a history of arrival times of upstream frames previously received at the central node. The system inserts the received upstream frame into a reassembly buffer within the central node based on the timestamp and the arrival time of the received upstream frame, and the history of arrival times of previously received upstream frames.

In a variation of this embodiment, the system associates one Logical Link Identifier (LLID) with all the upstream TDM channels received at the remote node.

In a variation of this embodiment, the granted TDM transmission window is sufficiently large to accommodate all the data received from one or more upstream TDM channels between two consecutive messages granting TDM transmission windows.

In a variation of this embodiment, the system receives Operation, Administration and Management (OA&M) information piggybacked to the message granting TDM transmission window.

In a variation of this embodiment, while encapsulating the data stored in the segmentation buffer into the packet, the system monitors the amount of data in the segmentation buffer within the remote node. Additionally, the system determines whether the amount of data in the segmentation buffer is greater than a pre-determined threshold. The system further includes the buffered data in a Pseudo Wire Emulation Edge to Edge (PWE3) frame to wait for the next message granting an upstream TDM transmission window based on the amount of data in the segmentation buffer.

One embodiment of the present invention provides a system for accommodating TDM traffic in an EPON. During operation, the system stores in a reassembly buffer a packet containing TDM data received from a remote node. The system reassembles packets stored in the reassembly buffer to produce data for an upstream TDM channel. In addition, the system receives data from a downstream TDM channel at the central node, and stores the received data in a segmentation buffer. The system encapsulates the data stored in the segmentation buffer into a packet, and communicates the packet to a downstream transmission mechanism within the central node. The system transmits to the remote node a downstream frame containing the packet.

In a variation of this embodiment, the system determines a number of bytes to insert into the upstream TDM channel based on a RTP header for the received packet in the event of a lost packet.

In a variation of this embodiment, the system receives the downstream frame at the remote node, and associates an arrival time with the received downstream frame using a clock local to the remote node. The system maintains a history of arrival times of downstream frames previously received at the remote node, and inserts the received downstream frame into a reassembly buffer within the remote node based on the timestamp and the arrival time of the received downstream frame, and the history of arrival times of previously received downstream frames.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
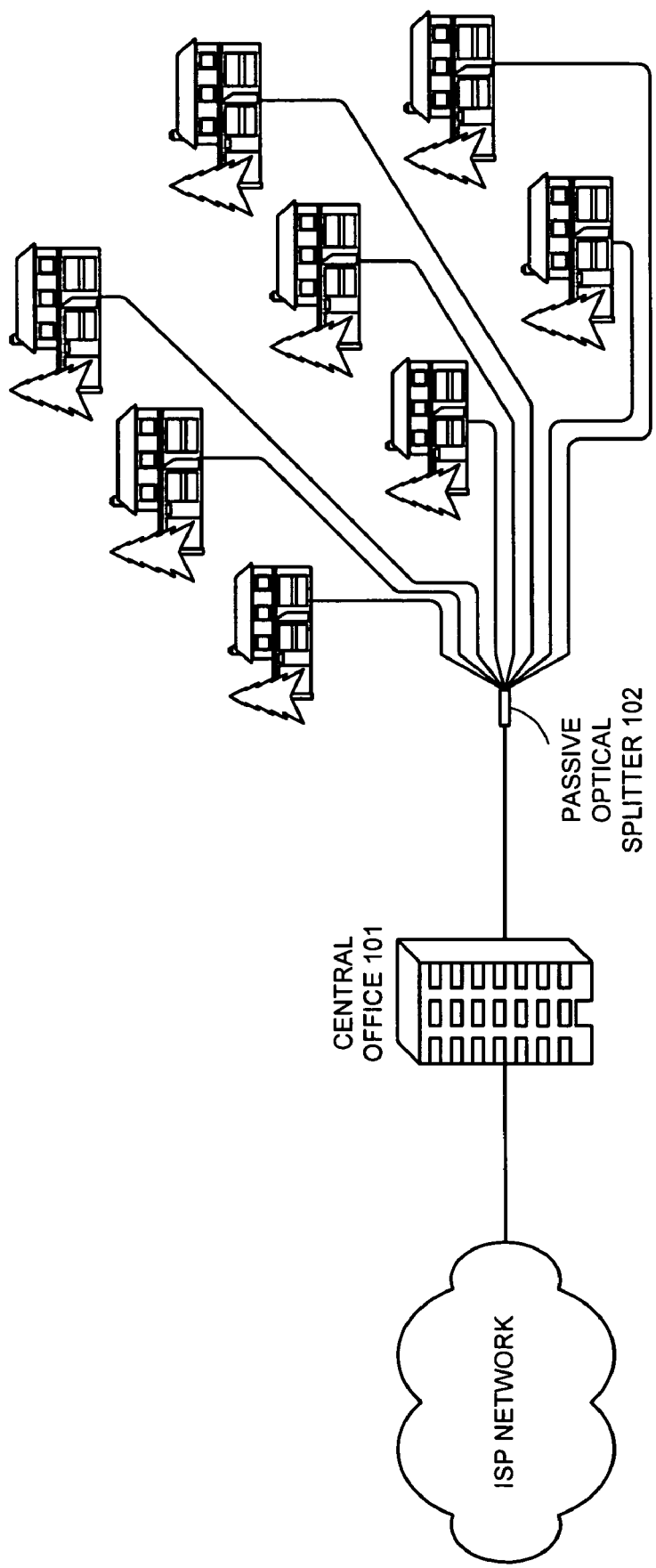
FIG. 1 illustrates an EPON wherein a central office and a number of subscribers are coupled through optical fibers and an Ethernet passive optical splitter (prior art).

FIG. 1 illustrates a passive optical network including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

Normal Operation Mode in EPON

Figure 2:
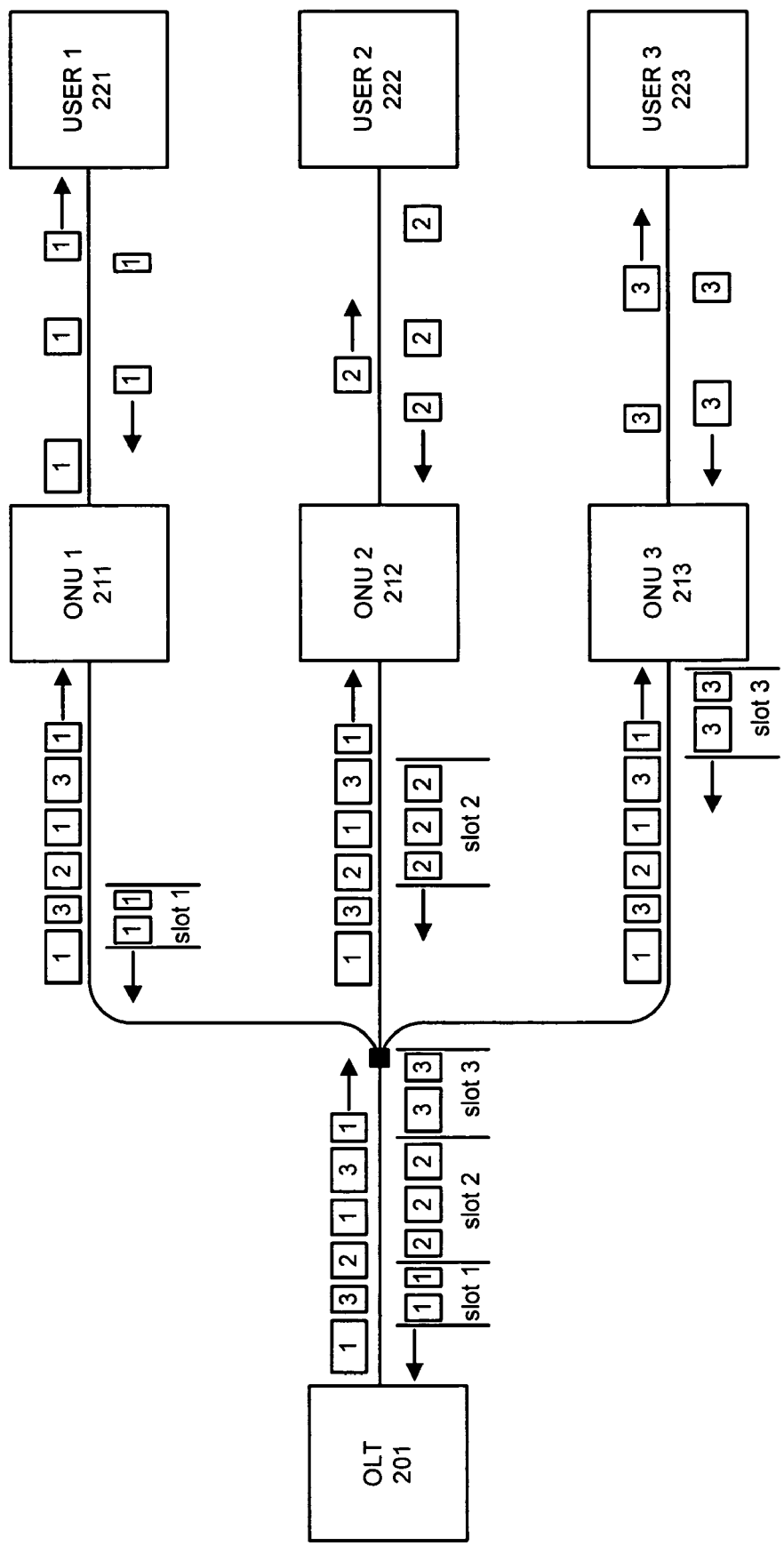
FIG. 2 illustrates an EPON in normal operation mode (prior art).

FIG. 2 illustrates an EPON in normal operation mode (prior art). To allow ONUs to join an EPON at arbitrary times, an EPON typically has two modes of operation: a normal operation mode and a discovery (initialization) mode. Regular upstream data transmissions occur in the normal operation mode, where an OLT assigns transmission windows to multiple initialized ONUs.

In the downstream direction, an OLT 201 broadcasts downstream data to ONU 1 (211), ONU 2 (212), and ONU 3 (213). While all ONUs receive the same copy of downstream data, each ONU selectively forwards only the data destined to its corresponding users, which are user 1 (221), user 2 (222), and user 3 (223), respectively.

According to the IEEE 802.3ah standard, both OLT and ONU implement a multi-point control protocol (MPCP) function within a MAC Control sublayer. MPCP is used by an EPON for scheduling of upstream transmissions.

In the upstream direction, OLT 201 first schedules and assigns transmission windows to each ONU according to the ONU's service-level agreement. The assignment process involves grant and report messages, or GATE and REPORT messages, as defined in IEEE 802.3ah standard. An OLT sends a GATE message to an ONU to assign a transmission window to the ONU. The GATE message specifies the start time and the length of the window. When not in a transmission window, an ONU typically buffers the data received from its user. When the scheduled transmission window arrives, the ONU transmits the buffered user data.

Because every ONU takes turns in transmitting upstream data according to the OLT's scheduling, the EPON system can utilize the upstream link's capacity efficiently. For the scheduling to work properly, the OLT needs to discover and initialize a newly joined ONU. During the discovery mode, the OLT reserves an interval, called discovery window, during which a newly joined ONU may report itself to the OLT. The OLT collects information critical to transmission scheduling for this ONU, such as the ONU's round-trip time (RTT), media access control (MAC) address, and service-level agreement.

Accommodating TDM Channels in EPON

Users of an EPON often request TDM-based services. A TDM channel can guarantee bandwidth and limit latency by carrying data in evenly distributed synchronous windows. An EPON, however, is an asynchronous packet-switched network and cannot directly accommodate TDM channels. Embodiments of the present invention allow an EPON to carry one or more TDM channels while satisfying stringent TDM QoS requirements. According to one embodiment, a TDM termination mechanism packetizes the data carried by a TDM channel, which allows regular EPON frames to transport the TDM channel.

Figure 3:
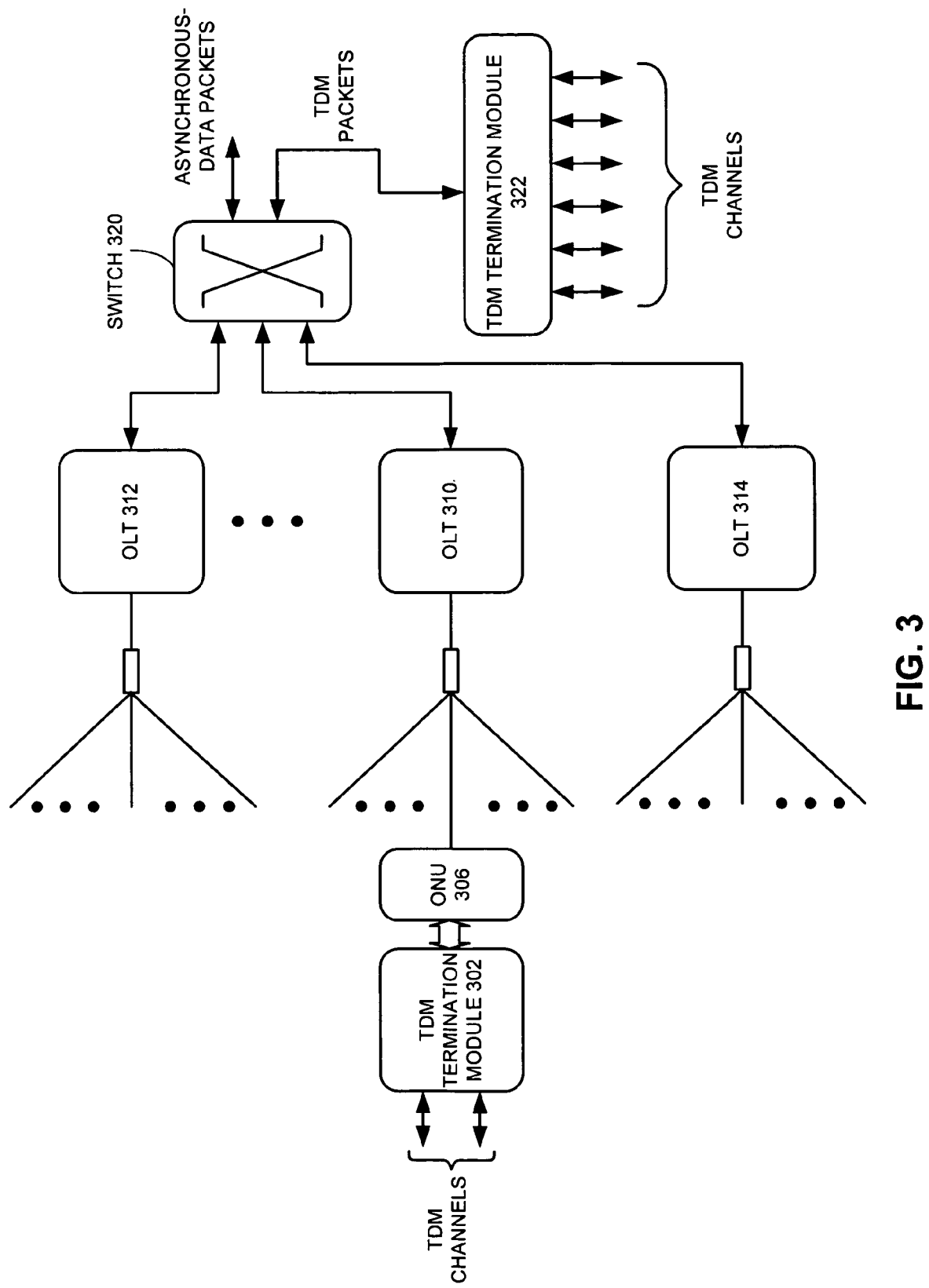
FIG. 3 illustrates an exemplary EPON architecture for accommodating TDM traffic in accordance with one embodiment of the present invention.

FIG. 3 illustrates an exemplary EPON architecture for accommodating TDM traffic in accordance with one embodiment of the present invention. On the ONU side, a TDM termination module 302 terminates a number of bi-directional TDM channels carrying serial bit streams. TDM termination module 302 segments upstream TDM channels and reassembles downstream TDM packets. In the upstream direction, TDM termination module 302 buffers the TDM bit streams and assembles the buffered bits into corresponding TDM packets using segmentation buffers. An ONU 306 subsequently transmits the TDM packets in transmission windows assigned by an OLT 310.

OLT 310 receives the TDM packets encapsulated in EPON frames. Based on the frames' Logical Link Identifiers (LLIDs, as defined in the IEEE 802.3ah standard), OLT 310 forwards packets destined to external networks to a switch 320. Switch 320 separates the TDM packets from the packets carrying asynchronous data, and forwards the TDM packets to a TDM termination module 322, which reassembles the TDM packets and reconstructs TDM channels using reassembly buffers. Switch 320 can serve multiple EPONs. In the illustrated example, switch 320 is coupled to OLTs 312, 310, and 314. Alternatively, switch 320 can serve a single OLT. An OLT may also perform the separation of TDM packets and the packets carrying asynchronous data.

Similarly, in the downstream direction, TDM termination module 322 segments the TDM channels and assembles the bytes into TDM packets using segmentation buffers. Switch 320 disseminates the TDM packets to the corresponding OLTs. At the tail-end, ONU 306 receives and forwards the downstream TDM packets to TDM termination module 302, which subsequently reassembles the TDM packets to reconstruct the corresponding TDM channels using reassembly buffers.

Figure 4:
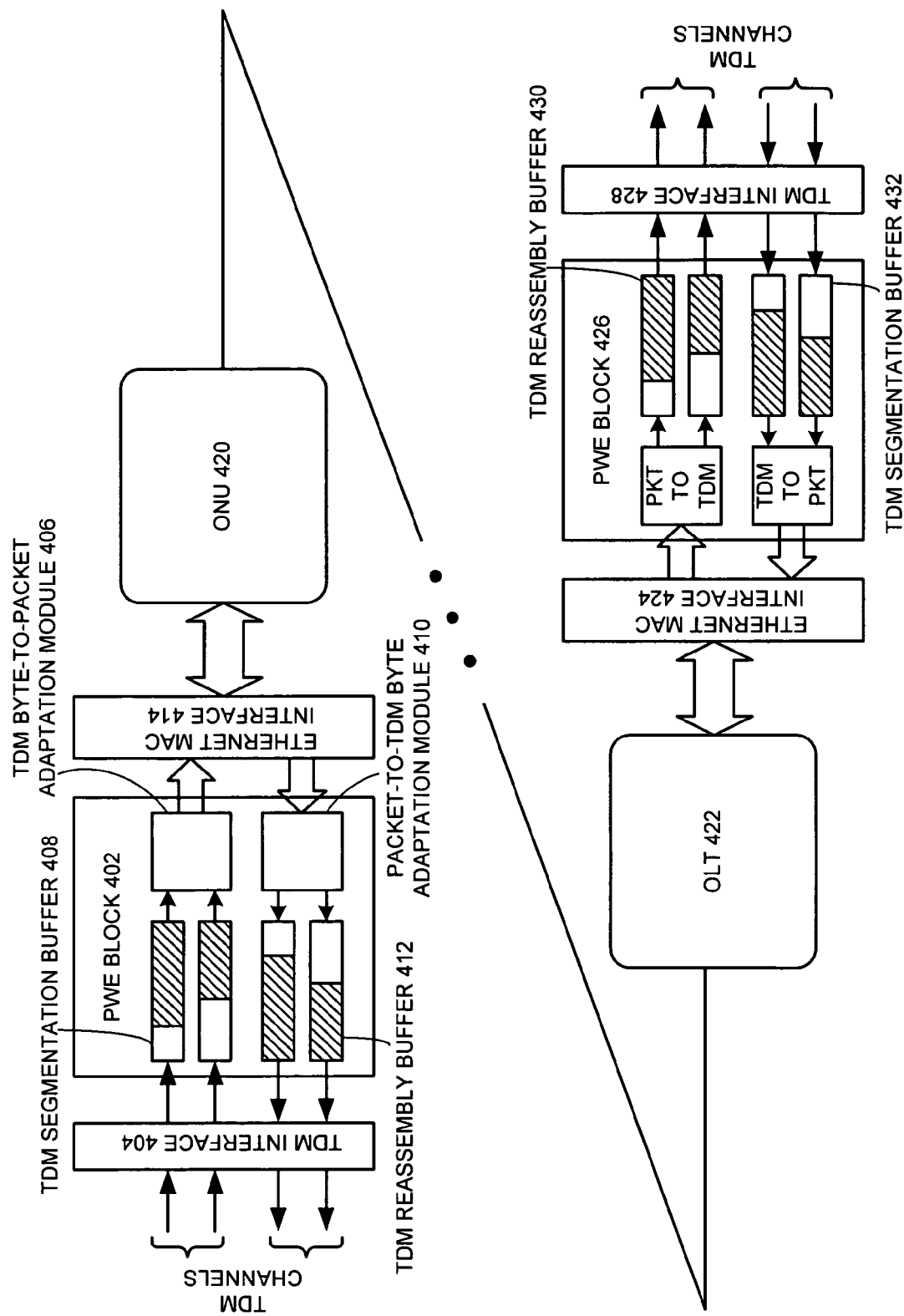
FIG. 4 illustrates an exemplary architecture of a TDM termination mechanism in accordance with one embodiment of the present invention.

FIG. 4 illustrates an exemplary architecture of a TDM termination mechanism in accordance with one embodiment of the present invention. In the upstream direction, on the ONU side, a TDM interface 404 receives and transmits the TDM channels. TDM interface 404 maintains the states of each TDM channel and provides the clocking for the serial bit streams. Note that the TDM channels may have different line rates, such as T1 or E1.

A Pseudo Wire Emulation (PWE) block 402 receives the bit streams from TDM interface 404 and assembles the TDM packets. PWE is a set of standards currently under development at the Internet Engineering Task Force (IETF). A PWE-enabled system encapsulates the TDM data arriving at an ingress logical port and carries the data across a packet-switched tunnel, managing timing, order, or other aspects of the packets entering and leaving the tunnel. From a customer's perspective, a pseudo wire emulated with PWE is perceived as an unshared link or circuit of the chosen service. In the illustrated example, PWE block 402 contains a number of segmentation buffers. In one embodiment, the segmentation buffers are first-in-first-out (FIFO) buffers, and each TDM channel has a dedicated segmentation buffer, such as segmentation buffer 408. In a further embodiment, a segmentation buffer has a fixed size of 512 bytes.

PWE block 402 includes a TDM byte-to-packet adaptation module 406 which fetches bytes stored in the segmentation buffers and assembles these bytes into packets. The packet format can comply with different protocols, for example, the Internet Protocol (IP) or the Multi-Protocol Label Switching (MPLS) protocol. In one embodiment, TDM byte-to-packet adaptation module 406 monitors the data stored in each segmentation buffer. When the amount of data in a segmentation buffer is greater than a pre-determined threshold, TDM byte-to-packet adaptation module 406 includes the buffered data in a Pseudo Wire Emulation Edge to Edge (PWE3) frame. The TDM packets are subsequently communicated to an Ethernet Medium Access Control (MAC) interface 414, which encapsulates the packets in Ethernet frames for transmission over the EPON.

Ethernet MAC interface 414 forwards the Ethernet frames carrying TDM packets to an ONU 420. ONU 420 temporarily buffers these frames with other Ethernet frames carrying non-TDM asynchronous data. When an upstream transmission window designated for TDM frames arrives, ONU 420 transmits these frames upstream to an OLT 422.

Upon receiving the frames, OLT 422 forwards the TDM frames to an Ethernet MAC interface 424, which extracts the TDM packets from the Ethernet frames. OLT 422 also performs the function of separating the frames carrying TDM packets from the frames carrying regular asynchronous data. Ethernet MAC interface 424 forwards the TDM packets to a packet-to-TDM byte adaptation module, which fetches the bytes carried in the TDM packets and stores the bytes in TDM reassembly buffers, such as reassembly buffer 430. The reassembly buffers absorb network jitter and output bit streams at fixed bit rates, which are subsequently fed into a TDM interface 428. In one embodiment, each reassembly buffer is a FIFO buffer, and each TDM channel has a dedicated reassembly buffer. In a further embodiment, a reassembly buffer has a configurable depth up to 4096 bytes with a one-byte granularity. This configuration can absorb a maximum jitter of +/−8 ms at an E1 data rate (2.048 Mbps). TDM interface 428 receives the bit streams emerging from the reassembly buffers and produces TDM channels according to specific formats, such as T1 or E1.

The system performs a similar process for downstream TDM channels. TDM interface 428 receives the downstream TDM channels and produces the corresponding bit streams. The bits streams are stored in TDM segmentation buffers, such as buffer 432. A TDM byte-to-packet adaptation module fetches the stored bytes and assembles TDM packets. Ethernet MAC interface 424 subsequently encapsulates the TDM packets in Ethernet frames. OLT 422 transmits the frames downstream to ONU 420. In one embodiment, all the TDM frames destined to one ONU share a common LLID.

After receiving the downstream frames, ONU 420 forwards the frames containing TDM packets to Ethernet MAC interface 414, which extracts the TDM packets from the Ethernet frames and sends the TDM packets to a packet-to-TDM byte adaptation module 410. Packet-to-TDM byte adaptation module 410 produces bit streams for different TDM channels from the received TDM packets and stores the bit streams in the corresponding TDM reassembly buffers, such as buffer 412, to absorb network jitter. TDM interface 404 receives the bit streams emerging from the reassembly buffers and produces the respective TDM channels.

Static Packet-Length Mode

In the downstream direction, an OLT can schedule transmission of TDM packets without introducing significant delay to the TDM data. The main source of delay incurred to the downstream TDM data is the buffering delay necessary for assembling TDM packets. Besides TDM traffic, other packet-based data may also be present at the OLT for downstream transmission. The OLT can assign high priority to the TDM traffic over other regular asynchronous data traffic and transmit a TDM packet as soon as the TDM packet is ready. In the upstream direction, however, timely transmission of TDM packets presents a challenge. An ONU typically does not have control over the starting time of a transmission window. Consequently, the lack of synchronization between the upstream transmission window and the TDM packets may cause significant delays to the upstream TDM data.

In one embodiment, the system segments a TDM channel and assembles the TDM bytes into packets with a fixed size. The segmentation buffer transmits a TDM packet to the ONU whenever a pre-determined number of TDM payload bytes have been buffered. For example, a TDM packet can have a fixed size of 47 bytes. Hence, each time 47 bytes of data become available in the segmentation buffer for a TDM channel, these 47 bytes are extracted and placed in a TDM packet. This TDM packet is then encapsulated in an Ethernet frame and transmitted to the ONU for subsequent upstream transmission. The network operator can configure the size of the TDM packets. For example, the system can configure a small TDM packet size to reduce the packetization delay at the cost of increased overhead. At the head-end, the OLT issues GATE messages at regular intervals to grant upstream transmission windows for the TDM frames.

At the ONU, a TDM packet may experience transmission jitter. Typically, the OLT does not synchronize the TDM upstream transmission windows to the packetization of TDM channels. Consequently, a TDM byte may experience variable delays at the ONU while waiting for a TDM upstream transmission window. This variable delay, or jitter, can be up to twice the time interval between two consecutive transmission windows, because a TDM byte may be first delayed in the segmentation buffer and then delayed at the ONU due to unsynchronized upstream transmission window. For example, a TDM byte encapsulated in a packet with a fixed size of 47 bytes for a T1 channel may experience a jitter up to 0.5 ms (2×47 bytes×8 bits/byte/1.544 Mbps).

On the OLT side, a reassembly buffer stores the received packets to absorb the jitter. The reassembly buffer is typically kept half full, so it can absorb both positive and negative jitters. In general, the reassembly buffer stores the received bytes for a period which is approximately the same as the maximum duration of the jitter. Consequently, the maximum total delay incurred to a TDM byte can be at least twice the jitter, because the reassembly buffer absorbs both positive and negative jitters. In the example above, a TDM byte may experience a maximum delay of 1 ms.

Figure 5A:
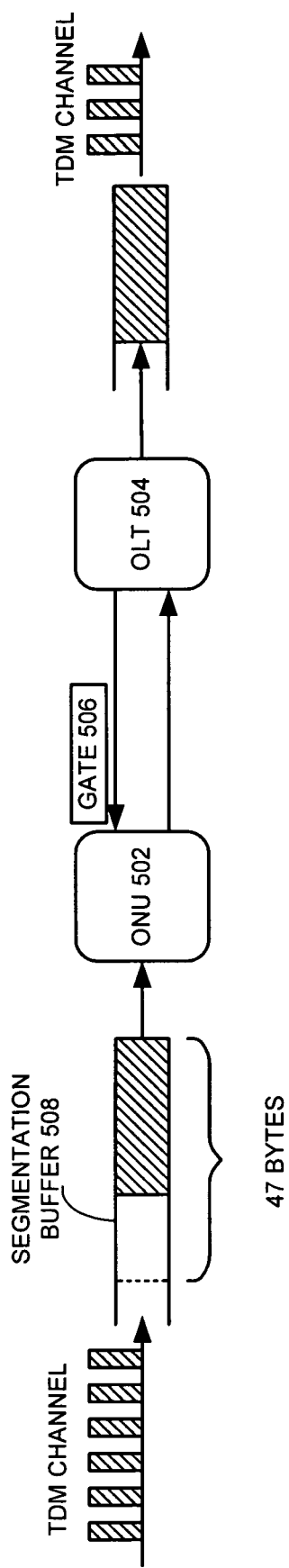
FIG. 5A illustrates an exemplary state of a TDM termination mechanism operating in a static-packet-length mode when a GATE message arrives in an EPON in accordance with one embodiment of the present invention.

FIG. 5A illustrates an exemplary state of a TDM termination mechanism operating in a static-packet-length mode when a GATE message arrives in an EPON in accordance with one embodiment of the present invention. Payload data of a TDM channel arrives at a segmentation buffer 508. Because a TDM packet has a fixed size of 47 bytes, no packet is transmitted to an ONU 502. Meanwhile, a GATE message 506 arrives at ONU 502 granting an upstream transmission window for TDM frames. If the segmentation buffer 508 contains fewer than 47 bytes when the transmission window is ready, the system does not transmit any TDM packet during this transmission window. As a result, the first byte in the TDM packet experiences a delay incurred in segmentation buffer 508 and a delay incurred in ONU 502 while waiting for the next available transmission window.

Figure 5B:
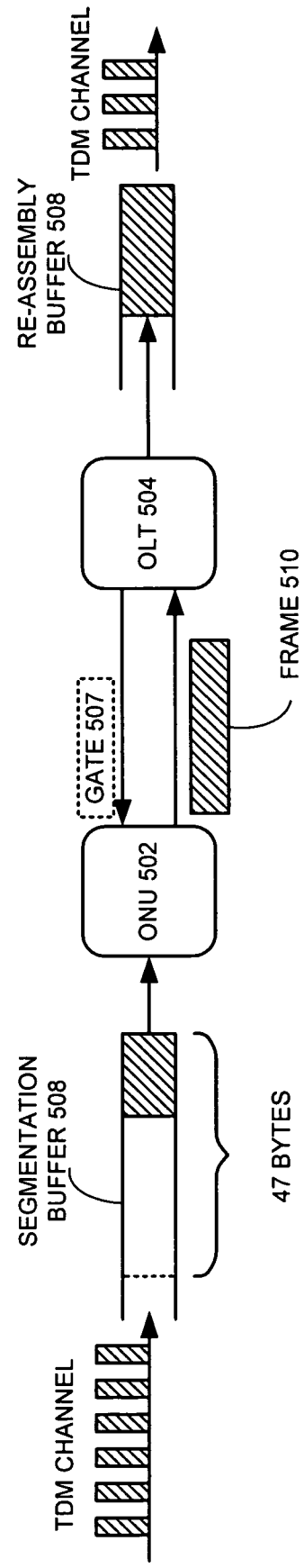
FIG. 5B illustrates an exemplary state of a TDM termination mechanism operating in a static-packet-length mode after transmitting an upstream TDM packet in accordance with one embodiment of the present invention.

FIG. 5B illustrates an exemplary state of a TDM termination mechanism operating in a static-packet-length mode after transmitting an upstream TDM packet in accordance with one embodiment of the present invention. After having received 47 bytes, segmentation buffer 508 assembles a TDM packet 510 encapsulated in a frame 510. ONU 502 subsequently transmits frame 510 in the next available transmission window granted by GATE message 507. Upon receiving frame 510, OLT 504 forwards frame 510 to a reassembly buffer 508, which buffers the TDM packets to absorb the jitter and outputs to a TDM channel.

Also contributing to the transport jitter is the time allocated for discovery windows which are inserted periodically between two transmission windows. Discovery windows are necessary for the OLT to register newly joined ONUs. Generally, discovery windows last for approximately 0.25 ms, which is added to the existing jitter. In the aforementioned example, a TDM byte may experience a jitter up to 0.75 ms (0.5 ms+0.25 ms). The resulting total delay, which is at least twice the jitter, can be up to 1.5 ms. Such a delay may not be acceptable because carriers typically allocate a delay budget of 1.5 ms for TDM traffic to an access plant. Therefore, the static packet-length mode of operation may not satisfy carrier requirement for TDM traffic. Embodiments of the present invention provide an alternatively mode, namely dynamic packet-length mode, to address this issue.

Dynamic Packet-Length Mode

A major source of delay incurred to TDM bytes is the jitter caused by the packetization process, which is unsynchronized to the upstream transmission windows. In one embodiment of the present invention, the TDM packetizer operates in a dynamic packet length mode, where assembly and transmission of a packet from the segmentation buffer to the ONU is triggered by a GATE message. The TDM packets can have variable sizes and are synchronized to the upstream transmission windows. Consequently, the maximum jitter a TDM byte may experience includes only one, instead of two, time interval between two consecutive transmission windows.

When operating in the dynamic packet length mode, the ONU forwards a received GATE message to the TDM packetizer, which in one embodiment is the PWE block. In response, the TDM packetizer processes the GATE message to determine whether the GATE message is for the TDM data, and, if so, the start time for the transmission window. A TDM byte-to-packet adaptation module assembles a TDM packet with all the bytes in the segmentation buffer sufficiently in advance of the start time for the upstream transmission window, so that a frame encapsulating the TDM packet is available for transmission. In one embodiment, all TDM channels coupled to the same ONU share a common LLID.

To ensure proper delay and jitter performance, the OLT scheduler ideally sends periodical GATE messages granting transmission windows sufficiently large to accommodate the TDM payload traffic accumulated from all the TDM channels accumulated during the interval between two consecutive transmission windows. The system can also configure a maximum byte count for the TDM frames and detect GATE messages granting transmission windows that are insufficient for transmitting TDM frames.

In one embodiment, the system inserts a Real Time Protocol (RTP) header in a TDM frame to manage lost packets. The RTP header includes a packet sequence number and a timestamp. The packet sequence number can be, for example, 32 bits long and can facilitate detection of duplicate, out-or-order, or missing frames. The system can configure the starting value for the sequence number. In one embodiment, the starting value is a random number. The timestamp in the RTP header provides a bit count for the TDM channel. Based on this bit count, the system can determine the number of bytes to insert into a TDM channel in the event of a lost packet.

In a further embodiment of the present invention, the system uses a timestamp to reduce the jitter incurred to packetized TDM traffic. When traffic of a TDM channel arrives at the TDM interface of an ONU, the TDM signal typically exhibits a very low variance in frequency, due to the stringent jitter requirement for TDM channels. The TDM signal is also required to provide a clock for its data which may be used by the segmentation process. Assuming that each TDM packet's size is $M_k$ in term of bits, where k is the packet index, the time between the formation of two consecutive TDM packets, whose sizes are $M_k$ and $M_{k-1}$ respectively, can be measured as the difference between the arrival times of the last bits of these two packets.

Each TDM packet can experience a waiting time while being buffered in the ONU, because the GATE messages are not synchronized to the TDM packetization process. While a TDM packet is buffered, the ONU attaches a timestamp to the TDM packet. This timestamp, denoted as Frame Availability Time in one embodiment, indicates the time when the TDM packet becomes available when the last bit of the packet arrives from the TDM channel. Because the local clock is derived from the TDM channel, the clock frequency drift is negligible. Therefore, the timestamp can be sufficiently accurate. In one embodiment, a TDM packet k includes both the timestamp and information indicative of its size $M_k$. In a further embodiment, the timestamp is included in the RTP header for the packet.

Assume that the timestamp for TDM packet k is denoted as $T_k$. The timestamp for the next TDM packet k+1, measured in the transmission time of one bit, is:

$$T_{k+1} = T_k + M_{k+1} \quad (1)$$

After transmission through the medium, the TDM packet arrives at the input of the OLT. The OLT measures the time of the packet arrival using a locally derived TDM clock. As described below, this local clock is phase-locked to the TDM packets after the jitter of these packets are compensated for. This local clock within the OLT provides a stable, low-frequency-variance representation of the clock at the ONU.

In general, the difference between the arrival times of two consecutive TDM packets at the OLT is not $M_k$ due to delays incurred at the ONU. At the OLT, the discrepancy between the timestamp difference and the actual arrival-time difference of two consecutive packets indicates an advance time or a retard time, denoted as $\Delta$, of the current TDM packet with respect to the previous packet upon arrival at the OLT. Assuming that the arrival times of two consecutive packets are $A_k$ and $A_{k-1}$, respectively, $\Delta$ can be calculated as:

$$\Delta = (A_k - A_{k-1}) - (T_k - T_{k-1}) \quad (2)$$

A positive $\Delta$ value indicates a retard time of the current packet with respect to the previous packet, and a negative $\Delta$ value indicates an advance time. In one embodiment, when the system boots up for the first time, the very first received packet is treated as the "standard-time" packet and is used as a reference for all subsequent packets.

This advance or retard time $\Delta$ is then applied to the TDM packet in conjunction with the measured arrival time to precisely adjust the moment for inserting the packet to a queue which produces the recovered TDM data stream. This time-adjusted insertion compensates for the jitter incurred to the TDM packet. Furthermore, the output of the queue provide a bit-stream input to a Phase-Locked Loop (PLL) which in turn produces a clock signal with substantially the same frequency as the associated TDM channel clock at the ONU. Hence, by attaching timestamps to each TDM packet, the OLT can be substantially synchronized to the ONU.

This jitter reduction mechanism can work with both upstream and downstream TDM channels. Therefore, the description above also applies to the configuration where an OLT segments a TDM channel and an ONU reassembles the TDM packets. Furthermore, this mechanism also works with the static packet-length mode, in which case the difference between the timestamps of any two consecutive packets is a constant value corresponding to the packet size.

Figure 6A:
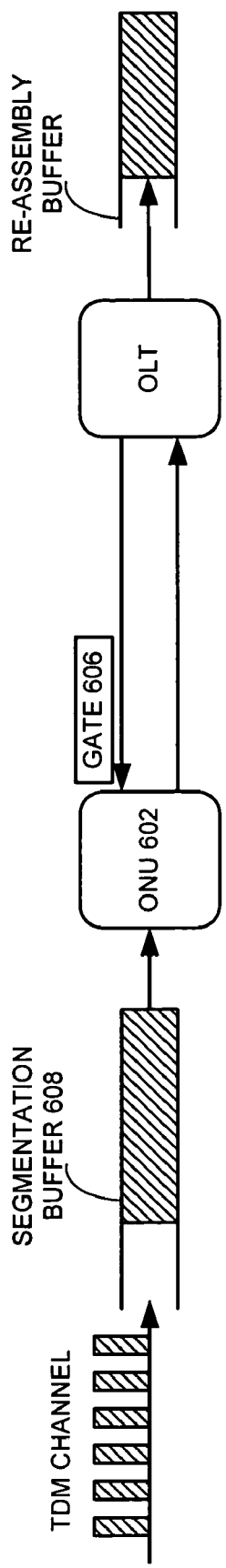
FIG. 6A illustrates an exemplary state of a TDM termination mechanism operating in a dynamic-packet-length mode when a GATE message arrives in accordance with one embodiment of the present invention.

FIG. 6A illustrates an exemplary state of a TDM termination mechanism operating in a dynamic-packet-length mode when a GATE message arrives in accordance with one embodiment of the present invention. Payload data of a TDM channel arrives at a segmentation buffer 608. An ONU 602 receives a GATE message 606 granting an upstream transmission window for TDM frames. ONU 602 forwards GATE message 606 to the TDM packetizer, which process GATE message 606 and determines the start time of an upstream transmission window for the TDM frame.

Figure 6B:
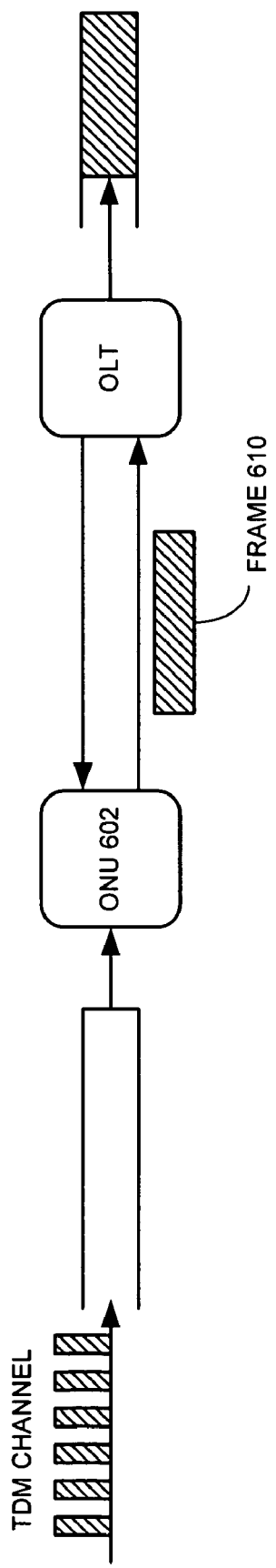
FIG. 6B illustrates an exemplary state of a TDM termination mechanism operating in a dynamic-packet-length mode after transmitting an upstream TDM packet in accordance with one embodiment of the present invention.

FIG. 6B illustrates an exemplary state of a TDM termination mechanism operating in a dynamic-packet-length mode after transmitting an upstream TDM packet in accordance with one embodiment of the present invention. Prior to the start time of the upstream transmission window, the TDM packetizer assembles a TDM packet encapsulated in a frame 610 using all the bytes stored in the segmentation buffer. ONU 602 subsequently transmits frame 610 to OLT 604. In this way, the system incurs minimum delay to the TDM bytes within ONU 602 and reduces the corresponding jitter and network delay.

Figure 7:
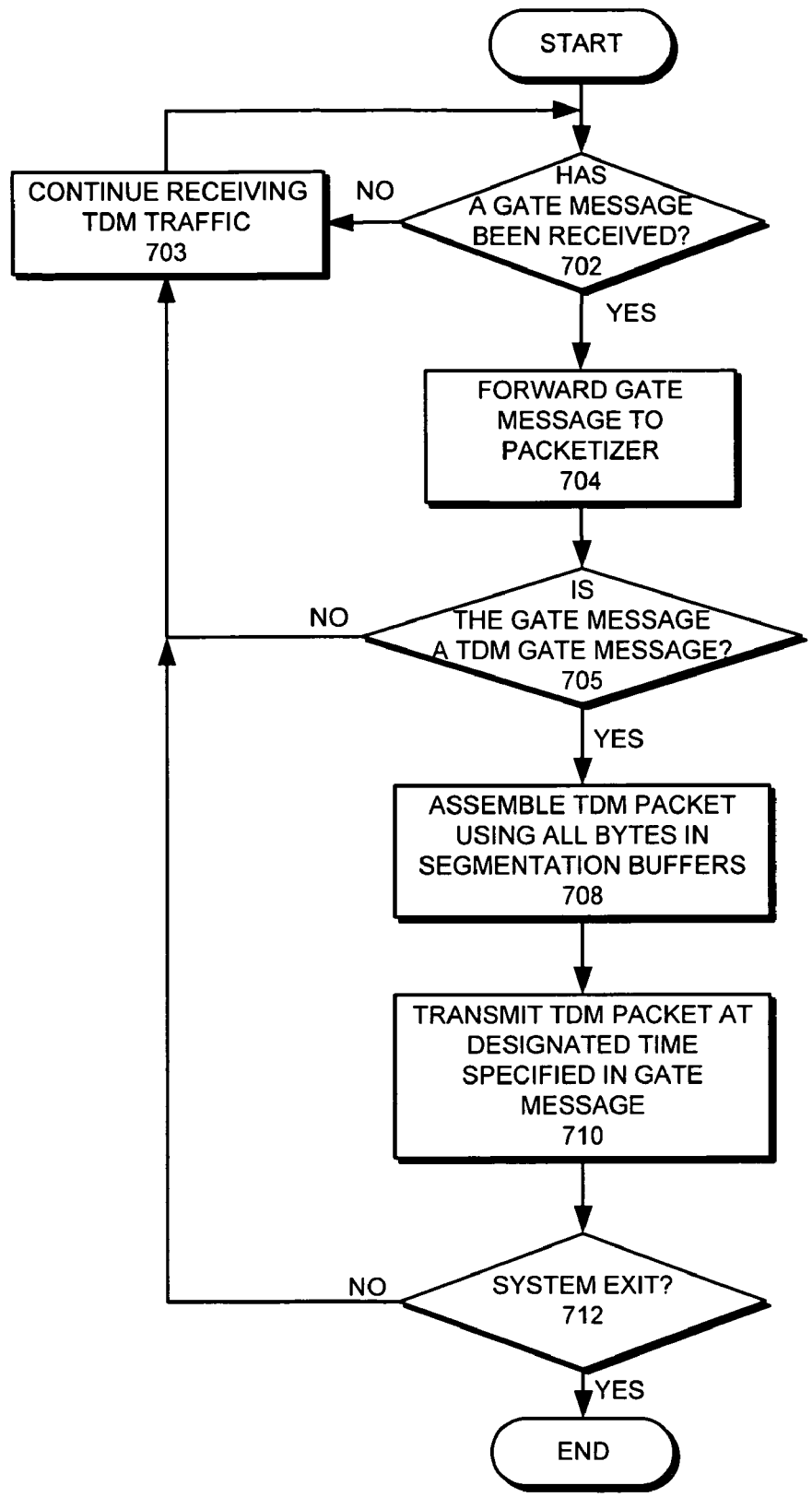
FIG. 7 presents a flow chart illustrating an exemplary dynamic-packet-length operation of a TDM termination mechanism in accordance with one embodiment of the present invention.

FIG. 7 presents a flow chart illustrating an exemplary dynamic-packet-length operation of a TDM termination mechanism in accordance with one embodiment of the present invention. During operation, the system determines whether a GATE message has been received (step 702). If not, the system continues receiving TDM traffic and buffers the received bytes in the segmentation buffers (step 703). If the system has received a GATE message, the system forwards the GATE message to the TDM packetizer (step 704), which subsequently determines whether the GATE message is a TDM GATE message (step 705). If so, the system assembles a TDM packet using all the bytes in the segmentation buffers before the start time of the assigned transmission window (step 708). Otherwise, the system continues receiving TDM traffic (step 703).

After assembling the TDM packet, the system transmits a frame encapsulating the TDM packet at the designated time specified in the GATE message (step 710). If the system subsequently receives an exit command (step 712), the system exits accordingly. Otherwise, the system continues receiving TDM traffic (step 703) and waits for the next GATE message.

In one embodiment, the OLT may piggy-back Operation, Administration and Management (OA&M) information to the TDM GATE messages. Because the OLT transmits TDM GATE messages at substantially regular intervals, the piggy-backing of OA&M information facilitates a convenient communication channel for the network management information.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accommodating time-division multiplexing (TDM) traffic in an Ethernet passive optical network (EPON), the method comprising:
    receiving data from an upstream TDM channel at a remote node;
    storing the received data in a segmentation buffer;
    encapsulating the data stored in the segmentation buffer into a packet;
    receiving a message from a central node granting a TDM transmission window starting at a designated time;
    communicating the packet to an upstream transmission mechanism within the remote node before the designated time; and
    transmitting to the central node an upstream frame containing the packet at the designated time.

2. The method of claim 1, wherein the packet is of varying size.

3. The method of claim 2, further comprising including a Real-Time Transport Protocol (RTP) header in the upstream frame, wherein the RTP header includes a timestamp that indicates the time when the data stored in the segmentation buffer is encapsulated into the packet.

4. The method of claim 3, further comprising:
    receiving the upstream frame at the central node;
    associating an arrival time with the received upstream frame using a clock local to the central node;
    maintaining a history of arrival times of upstream frames previously received at the central node; and
    inserting the received upstream frame into a reassembly buffer within the central node based on the timestamp and the arrival time of the received upstream frame, and the history of arrival times of previously received upstream frames.

5. The method of claim 1, further comprising associating one Logical Link Identifier (LLID) with all the upstream TDM channels received at the remote node.

6. The method of claim 1, wherein the granted TDM transmission window is sufficiently large to accommodate all the data received from one or more upstream TDM channels between two consecutive messages granting TDM transmission windows.

7. The method of claim 1, further comprising receiving Operation, Administration and Management (OA&M) information piggybacked to the message granting TDM transmission window.

8. The method of claim 1, wherein encapsulating the data stored in the segmentation buffer involves:
    monitoring the amount of data in the segmentation buffer within the remote node;
    determining whether the amount of data in the segmentation buffer is greater than a pre-determined threshold; and
    including the buffered data in a Pseudo Wire Emulation Edge to Edge (PWE3) frame to wait for the next message granting an upstream TDM transmission window based on the amount of data in the segmentation buffer.

9. A method for accommodating TDM traffic in an EPON, the method comprising:
    storing in a reassembly buffer within a central node a packet containing upstream TDM data received from a remote node;
    determining a number of bytes to insert into the upstream TDM channel based on a RTP header for the received packet in the event of a lost packet;
    reassembling packets stored in the reassembly buffer to produce data for an upstream TDM channel;
    receiving data from a downstream TDM channel at the central node;
    storing the received data in a segmentation buffer;
    encapsulating the data stored in the segmentation buffer into a packet;
    communicating the packet to a downstream transmission mechanism within the central node; and
    transmitting to the remote node a downstream frame containing the packet.

10. The method of claim 9, further comprising:
    receiving the downstream frame at the remote node;
    associating an arrival time with the received downstream frame using a clock local to the remote node;
    maintaining a history of arrival times of downstream frames previously received at the remote node; and
    inserting the received downstream frame into a reassembly buffer within the remote node based on the timestamp and the arrival time of the received downstream frame, and the history of arrival times of previously received downstream frames.

11. An apparatus for accommodating TDM traffic in an EPON, the apparatus comprising:
    a remote-node TDM interface configured to receive data from an upstream TDM channel at a remote node;
    a segmentation buffer configured to store the received data;

a remote-node receiving mechanism configured to receive a message from the central node granting a TDM transmission window starting at a designated time;

a packetizer configured to encapsulate the data stored in the segmentation buffer into a packet and to communicate the packet to an upstream transmission mechanism within the remote node before the designated time; and a transmission mechanism configured to transmit to the central node an upstream frame containing the packet at the designated time.

12. The apparatus of claim 11, wherein the packet is of varying size.

13. The apparatus of claim 12, further comprising a framing mechanism configured to include a RTP header in the frame, wherein the RTP header includes a timestamp that indicates the time when the data stored in the segmentation buffer is encapsulated into the packet.

14. The apparatus of claim 13, further comprising:

a central-node receiving mechanism within the central node configured to receive the upstream frame;

an association mechanism within the central node configured to associate an arrival time with the received upstream frame using a clock local to the central node;

a recording mechanism within the central node configured to maintain a history of arrival times of upstream frames previously received at the central node; and an insertion mechanism within the central node configured to insert the received upstream frame into a reassembly buffer within the central node based on the timestamp and the arrival time of the received upstream frame, and the history of arrival times of previously received upstream frames.

15. The apparatus of claim 11, further comprising a remote-node LLID association mechanism configured to associate one LLID with all the TDM channels received at the remote node.

16. The apparatus of claim 11, wherein the granted TDM transmission window is sufficiently large to accommodate all the data received from one or more upstream TDM channels between two consecutive messages granting TDM transmission windows.

17. The apparatus of claim 11, wherein the remote-node receiving mechanism is further configured to receive OA&M information piggybacked to the message granting TDM transmission window.

18. The apparatus of claim 11, wherein while encapsulating the data stored in the segmentation buffer into the packet, the packetizer is configured to:

monitor the amount of data in the segmentation buffer within the remote node;

determine whether the amount of data in the segmentation buffer is greater than a pre-determined threshold; and to include the buffered data in a PWE3 frame to wait for the next message granting an upstream TDM transmission window based on the amount of data in the segmentation buffer.

19. An apparatus for accommodating TDM traffic in an EPON, the apparatus comprising:

a reassembly buffer configured to store a packet containing upstream TDM data received from a remote node;

a determination mechanism configured to determine a number of bytes to insert into the upstream TDM channel based on a RTP header for the received packet in the event of a lost packet;

a reassembly mechanism configured to reassemble packets stored in the reassembly buffer to produce data for an upstream TDM channel;

a central-node TDM interface configured to receive data from a downstream TDM channel at the central node;

a segmentation buffer configured to store the received data;

an encapsulation mechanism configured to encapsulate the data stored in the segmentation buffer into a packet;

a communication mechanism configured to communicate the packet to a downstream transmission mechanism within the central node; and a transmission mechanism configured to transmit to the remote node a downstream frame containing the packet.

20. The apparatus of claim 19, further comprising:

a remote-node receiving mechanism configured to receive the downstream frame;

an association mechanism configured to associate an arrival time with the received downstream frame using a clock local to the remote node;

a recording mechanism configured to maintain a history of arrival times of downstream frames previously received at the remote node; and an insertion mechanism configured to insert the received downstream frame into a reassembly buffer within the remote node based on the timestamp and the arrival time of the received downstream frame, and the history of arrival times of previously received downstream frames.

\* \* \* \* \*